United States Patent
Weidman

(10) Patent No.: US 11,089,044 B2
(45) Date of Patent: *Aug. 10, 2021

(54) METHOD AND SYSTEM FOR ASSESSING DATA SECURITY

(71) Applicant: Shevirah Inc., Herndon, VA (US)

(72) Inventor: Georgia Weidman, Ashburn, VA (US)

(73) Assignee: Shevirah Inc., Herndon, VA (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/556,694

(22) Filed: Aug. 30, 2019

(65) Prior Publication Data

US 2019/0387016 A1 Dec. 19, 2019

Related U.S. Application Data

(63) Continuation of application No. 15/140,781, filed on Apr. 28, 2016, now Pat. No. 10,432,656.

(51) Int. Cl.
*H04L 29/06* (2006.01)
*H04W 12/12* (2021.01)

(52) U.S. Cl.
CPC .......... *H04L 63/1433* (2013.01); *H04L 63/14* (2013.01); *H04L 63/1441* (2013.01); *H04L 63/1483* (2013.01); *H04W 12/12* (2013.01)

(58) Field of Classification Search
CPC . H04L 63/1433; H04L 63/14; H04L 63/1441; H04L 63/1483; H04W 12/12
See application file for complete search history.

(56) References Cited

U.S. PATENT DOCUMENTS

| | | |
|---|---|---|
| 8,484,741 B1 | 7/2013 | Chapman |
| 8,608,487 B2 | 12/2013 | Huie et al. |
| 8,615,807 B1 | 12/2013 | Higbee et al. |
| 8,635,703 B1 | 1/2014 | Belani et al. |
| 8,793,799 B2 | 7/2014 | Fritzon et al. |
| 9,473,505 B1 | 10/2016 | Asano et al. |
| 9,591,017 B1 * | 3/2017 | Higbee ............... H04L 63/1416 |
| 9,674,221 B1 * | 6/2017 | Higbee ................... H04L 51/22 |
| 10,749,887 B2 * | 8/2020 | Hawthorn ........... H04L 63/1433 |
| 10,855,716 B2 * | 12/2020 | Irimie ..................... H04L 63/20 |
| 2003/0232648 A1 | 12/2003 | Prindle |
| 2005/0154553 A1 | 7/2005 | Wheeler et al. |
| 2005/0183143 A1 | 8/2005 | Anderholm et al. |
| 2006/0200855 A1 | 9/2006 | Willis |
| 2011/0219448 A1 | 9/2011 | Sreedharan et al. |
| 2012/0124671 A1 | 5/2012 | Fritzson et al. |
| 2012/0174225 A1 | 7/2012 | Shyamsunder et al. |
| 2013/0137393 A1 | 5/2013 | Sverdlov et al. |

(Continued)

FOREIGN PATENT DOCUMENTS

| | | | | |
|---|---|---|---|---|
| WO | WO-2012139127 A1 * | 10/2012 | ............. | G09B 19/00 |
| WO | WO-2016164844 A1 * | 10/2016 | ............. | H04L 51/12 |

*Primary Examiner* — John B King
(74) *Attorney, Agent, or Firm* — Maier & Maier, PLLC

(57) ABSTRACT

A method and system for conducting simulated phishing attacks. This may include identifying a target device from a list, such as a corporate directory, and sending a message to the device with a link to a website. On the website, the user may be directed to or enrolled in a network security course, or may be directed to install an app, which may then be used to gather data or further conduct simulated phishing attacks on other devices on a network.

20 Claims, 2 Drawing Sheets

(56) References Cited

U.S. PATENT DOCUMENTS

| | | |
|---|---|---|
| 2014/0199664 A1 | 7/2014 | Sadeh-Koniecpol et al. |
| 2014/0230064 A1* | 8/2014 | Higbee ............... G06Q 10/107 |
| | | 726/25 |
| 2015/0172305 A1 | 6/2015 | Dixon et al. |
| 2016/0029221 A1 | 1/2016 | Suarez Garcia et al. |
| 2016/0164866 A1 | 6/2016 | Oberheide et al. |
| 2016/0232349 A1 | 8/2016 | Baeder |
| 2016/0301705 A1* | 10/2016 | Higbee ............... H04L 63/1433 |
| 2017/0041309 A1 | 2/2017 | Ekambaram et al. |
| 2017/0078286 A1 | 3/2017 | Hunt et al. |
| 2017/0251010 A1* | 8/2017 | Irimie ................. H04L 63/1433 |
| 2018/0191754 A1* | 7/2018 | Higbee ................ G06F 21/554 |
| 2021/0021612 A1* | 1/2021 | Higbee .................. H04L 51/12 |

\* cited by examiner

METHOD AND SYSTEM FOR ASSESSING DATA SECURITY

CROSS-REFERENCE TO RELATED APPLICATIONS

This application claims priority from U.S. patent application Ser. No. 15/140,781, filed on Apr. 28, 2016, entitled "METHOD AND SYSTEM FOR ASSESSING DATA SECURITY," the entire contents of which are hereby incorporated by reference.

BACKGROUND

Over the past several years, the growing ubiquitousness of smartphones and tablets, and increasingly of wearables and other network-enabled devices (the "Internet-of-Things") has disrupted the traditional IT Enterprise. In many firms, this has caused an erosion of the "network perimeter," or the boundary between the firm's own private network and the public Internet. Endpoint security management has also become more difficult, as many more devices on a typical network are outside of the security perimeter. For example, many such devices have connections that may bypass the network firewall, or the devices may otherwise step outside the firewall.

According to a 2014 Ponemon Institute study, the average modern organization has over 23,000 mobile devices in use on their network, with over 37% of them carrying corporate information. The same study found that the majority of chief information security officers (CISOs) had experienced data losses from employee smartphones; many also lamented the difficulty in preventing the use of insecure devices by employees. The tight coupling of mobile solutions and cloud technology has led to many organizations no longer being able to easily control their data; often, many cannot even be certain where their data is. Time and money spent improving the security of a crucial corporate system, like a corporate customer relationship management (CRM) system, may be completely wasted if employees forgo its use in favor of personal accounts on cloud-based CRM applications synced to their insecure phones.

Worse yet, most organizations do not even know the degree to which mobile endpoints represent security risks to the organization. For example, it might not be clear what percentage of employees are using jailbroken phones, what percentage have installed or run trojan-horse applications that leech data, or what percentage update their device software to fix known security flaws. Many enterprise-connected phones may still be susceptible to known device attacks, making security protocols relatively easy to bypass. Unknown—potentially huge—amounts of corporate data may be exposed.

SUMMARY

According to an exemplary embodiment, a method of assessing data security may comprise conducting a simulated phishing attack on one or more target devices, wherein the simulated phishing attack comprises: selecting, with a processor, one or more target devices from a plurality of target devices, generating, with a processor, a message intended for the one or more target devices, the message comprising a message body and a message hyperlink referring to a website, and sending, with a processor, the message intended for the one or more target devices to the one or more target devices; electronically recording, in a computer readable storage medium, one or more devices that have accessed the website; identifying, with a processor, a device in the one or more devices that have accessed the website that is also a target device in the one or more target devices, and identifying a user associated with the device; and automatically enrolling, with a processor, the user in a security course. The message may be sent using, for example, SMS, MMS, email, instant messaging, in-app messaging, near-field communication (NFC), Bluetooth, ZigBee, Z-Wave, voice communication, or another form of electronic communication, as desired. In an exemplary embodiment, the website may be configured to harvest user credentials, or may prompt the user to take an action that will leave their device more vulnerable to an attack; for example, the user may be prompted to download a file that will create a vulnerability on their device that can be used as an attack vector.

According to another exemplary embodiment, a method of assessing data security may comprise conducting a simulated phishing attack on a target device, wherein the simulated phishing attack comprises: selecting, with a processor, a target device from a plurality of target devices, generating, with a processor, a message intended for the target device, the message comprising a message body and a message hyperlink referring to a website, and sending, with a processor, the message intended for the target device to the target device; displaying, on a display of the target device, the website, the website comprising a download location for a malicious app, the malicious app being configured to communicate with a server apparatus and being configured to obfuscate its communications with the server apparatus; prompting a user of the target device to download the malicious app; electronically recording, in a computer readable storage medium, a target device that has downloaded the malicious app; identifying, with a processor, the user of the target device that has downloaded the malicious app; and mitigating the security risk of the user. The app may contain, or may contain instructions to install, an on-device agent.

According to another exemplary embodiment, a system for assessing data security may comprise a server apparatus, the server apparatus comprising a database, a web server, an engine comprising a processor, and a listener system, the listener system comprising at least one of a listener and a poller; and a target device, the target device having a processor and a memory comprising a malicious app including computer program code, the memory and the computer program code configured to, with the processor, cause the target device to at least: receive, with a processor of the target device, communications from the engine of the server apparatus; send, with a processor of the target device, communications to the listener system of the server apparatus; and install, with a processor of the target device and on a memory of the target device, an on-device agent.

DETAILED DESCRIPTION

Figure 1:
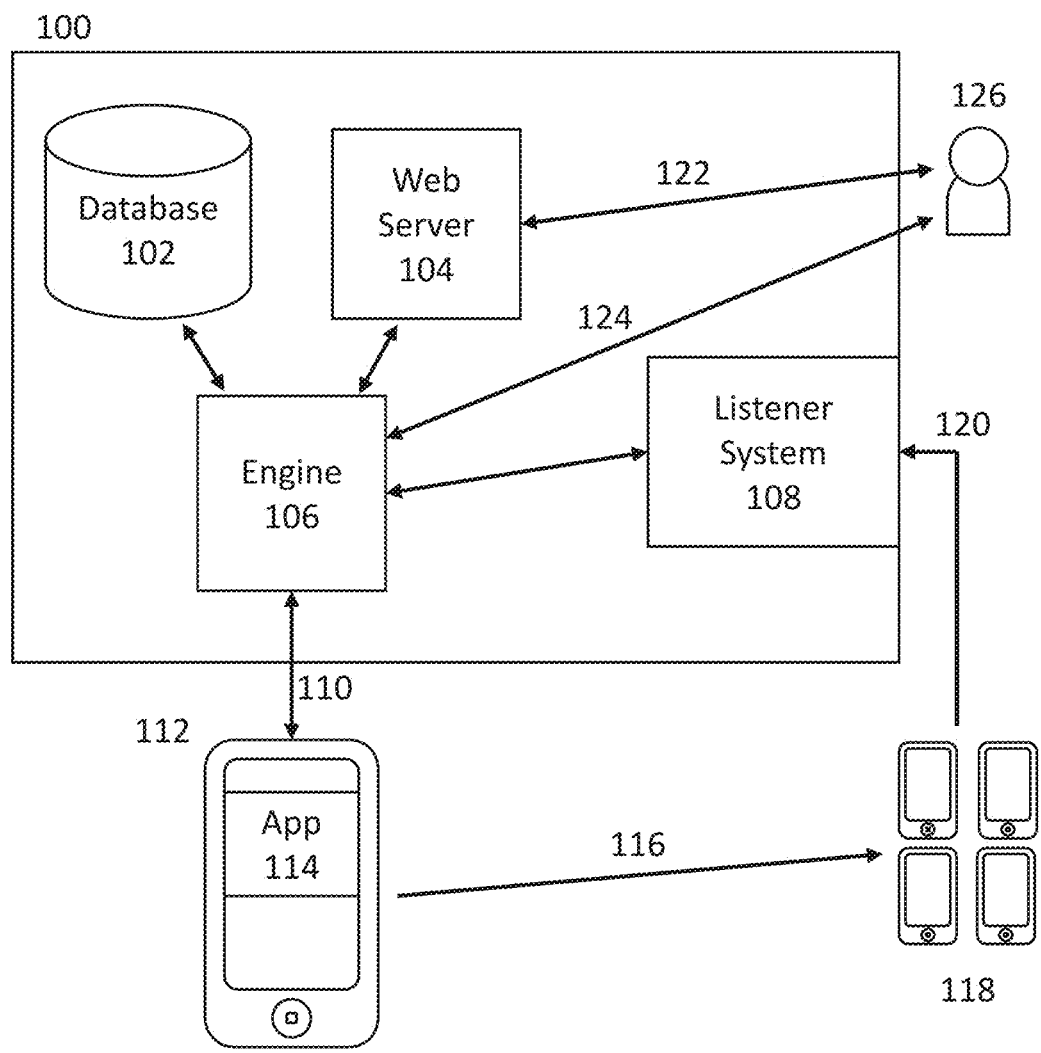
FIG. 1 is an exemplary embodiment of a system diagram of a system for assessing data security.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to an exemplary embodiment, a method and system for assessing data security may be provided, which may be used to give a corporate CISO or similar corporate or organizational officer insight into the security posture of the mobile devices connected to the enterprise network, and into the security knowledge of the owners of said mobile devices. Such an exemplary embodiment may function generally by simulating hacking attacks on some number of corporate-managed devices or other endpoints in order to determine the likely effectiveness of a non-simulated hacking attack.

Various implementations and embodiments of a system for assessing data security may be understood. Different embodiments of the system may, for example, communicate using a different protocol or using a different medium, or may be configured to simulate different types of hacking attacks, or otherwise function as desired. For example, according to one exemplary embodiment, a system for assessing data security may incorporate an SMS gateway, and may send SMS messages to targeted phones or other devices on the network. According to another exemplary embodiment, a system for assessing data security may send messages via MMS, email, instant messaging, in-app messaging, near-field communication (NFC), Bluetooth, ZigBee, Z-Wave, voice communication, or another form of electronic communication, as desired. More esoteric protocols or means of communication, such as satellite communication, infrared messaging, various industrial protocols such as HART or ISA 100a, or currently undeveloped or underdeveloped protocols such as IEEE 802.22 may also be utilized, as desired. According to another exemplary embodiment, multiple systems or protocols for sending messages may be available; for example, according to an exemplary embodiment, both SMS messaging and MMS messaging may be available to a particular mobile device that is configured to operate as a system for assessing data security.

The system for assessing data security may also target mobile devices that are not currently on the network, for example mobile devices that are corporate-managed or registered to a corporate employee. This may allow the system for assessing data security to better assess potential vulnerabilities in organizational data security. According to an exemplary embodiment, this may include, for example, messaging or contacting employees on these devices during non-work hours, when employees may not be concentrating as heavily on following workplace security measures. An exemplary embodiment of a system for assessing data security may also target mobile devices on specific times or dates that may be more favorable to an attacker in order to gauge security under least favorable conditions. For example, according to an exemplary embodiment, the system may send messages to corporate-managed mobile devices at 10 PM on a Friday evening, or after the end of local "happy hour" specials, in order to gauge the potential security vulnerabilities that might be caused by employees thinking less clearly at such times.

According to an exemplary embodiment, a system for assessing data security may be given the contact information, such as phone numbers, for a plurality of corporate-managed mobile devices, and may then attempt to gain access to these devices or otherwise execute attacks on them. This may include, for example, sending a message to a target mobile device including a link to a malicious website, such as a credential harvesting website, or may include sending a message to a target mobile device including a link to a malicious application, prompting the user of the mobile device to accept the malicious application, and then executing an action once the user has accepted the malicious application. This may also include, for example, prompting a user to download a data file or other file (such as a MDAC, PDF, or HCP file) which may have various vendor vulnerabilities, which may then later be exploited. According to an exemplary embodiment, once a user has navigated to a malicious website or accepted a malicious application, the system for assessing data security may direct a user to a training website or enroll the user in a training class, may log the acceptance, may alert a corporate officer, an employee in charge of managing information security, or other party of the acceptance, or may perform another action, as desired. According to an exemplary embodiment, if the user has accepted a malicious application, or has downloaded a file that makes their device vulnerable to client-side exploitation, the malicious application may perform device-specific actions, such as redirecting the user's Web traffic on the device to a training website, or locking the user's device until they complete a training class, or other device-specific actions, as desired. Multiple types of attack may be available to the system for assessing data security; according to an exemplary embodiment, the system for assessing data security may be configured to cycle between valid types of attack, or may be configured to select an optimal type of attack based on device information, or may be otherwise automatically configurable or manually configurable, as desired.

A malicious application used by the system for assessing data security may be, for example, a modified version of an existing application. For example, according to an exemplary embodiment, a benign application, such as a third-party application commercially available for free or for purchase in the marketplace, may be modified such that the modified application offers all of the functionality of a malicious application while still being functional for its intended, benign purpose. The system for assessing data security may then share a download link to the malicious application under the guide of the benign application in order to deceive users into downloading it.

According to an exemplary embodiment, a system for assessing data security may also take other action to probe for vulnerabilities in a target mobile device or otherwise gauge mobile device security. For example, according to one exemplary embodiment, the system for assessing data security may install or attempt to install an on-device agent on a particular mobile device in order to measure the degree of device security, or may otherwise test or scan a particular mobile device. On-device agent may also be used to, for example, check for any corporate information or any specified corporate information, or any other information or programs, as desired.

According to another exemplary embodiment, the on-device agent may be used to evaluate the compliance of the device with the policy of a company or organization. For example, in a particular exemplary embodiment, it may be the policy of a company that all devices are to use some form of encryption or a specific form of encryption. In another embodiment, it may be policy that the user must have a login PIN or password that meets a certain length or complexity requirement. In another embodiment, a user may be required by policy to use certain forms of security on the device, such as biometrics, or may be required to have multi-factor authentication set up. The system for assessing data security may test or scan the mobile device in order to evaluate whether these requirements have actually been met.

According to an exemplary embodiment, the on-device agent may interact with other applications on a particular mobile device. For example, according to one exemplary embodiment, a particular mobile device may have a sandbox for separating running programs, which may be used to isolate corporate or other organizational applications and data from other applications on the mobile device. The on-device agent may be used to evaluate the actual security of these sandboxes. For example, according to an exemplary embodiment, the on-device agent may probe for known sandboxed applications, or known sandbox structures, and may attempt to gain access to any that it finds. The on-device agent may, for example, test to see if sandboxed data can be read, or may attempt to modify the sandboxed data or the sandbox application, as desired. According to another exemplary embodiment, a particular mobile device may have another application, program or feature that may be interacted with or evaluated by the on-device agent. For example, in an exemplary embodiment, the on-device agent may interact with on-device antivirus software, on-device firewalls, other on-device security software, policy elements or application wrappers, components of an EMM (enterprise mobility management) suite or similar programs (including, for example, programs implementing mobile device management (MDM), mobile application management (MAM), or mobile information management (MIM) features), or other applications, programs, or features, as desired.

A system for assessing data security may also take other action in order to probe for vulnerabilities. For example, according to an exemplary embodiment, a system for assessing data security may crawl websites, such as social media websites, or other data sources in order to locate personal contact information available for the users of corporate-managed mobile devices or other corporate employees. This personal contact information, such as the phone numbers corresponding to corporate-managed mobile devices, may then be used by the system for assessing data security for executing attacks. Compromised devices may also be scanned as sources of personal contact information; for example, if the phone of a CEO or other corporate officer is affected, this data may be scanned by the system for assessing data in order to determine the personal contact details of other corporate officers or leadership staff. This may allow the system for assessing data security to, for example, determine which endpoints are most vulnerable or insecure, or which post the biggest risk to the enterprise network, or determine anything else about those endpoints that may be desired.

The system for assessing data security may also harvest other data from compromised devices. For example, according to an exemplary embodiment, the system for assessing data security may harvest the personal contact details, or any other details, of any or all contacts in a user's mobile device, not just the personal contact details of contacts associated with a corporation or other organization (such as corporate officers). This may include, for example, contacts that have been specifically identified by the user as being grouped or as being important; for example, the system for assessing data security may harvest the personal contact details of any contacts identified as being customers of the company. According to another exemplary embodiment, the system for assessing data security may harvest other user data, such as personal information of the user or credentials of the user, which may include, for example, any passwords that happen to be stored on the mobile device. According to another exemplary embodiment, the system for assessing data security may harvest other corporate data, which may include, for example, trade secrets, sales forecasts, actual sales volumes or order volumes, sales quotas, corporate strategies, new product plans, financial projections, other financial documents such as budgets, budget requests, or pending or prospective bids, production and overhead costs for particular products, reports prepared for customers or for internal use, or other corporate data that may be of interest. The system for assessing data security may also harvest corporate manuals or references, which may, for example, include instructions on how to access corporate networks (such as instructions for using a home VPN), or other information of interest.

According to an exemplary embodiment, personal data harvesting may be done for the purpose of, for example, showing the user how secure or insecure any of their data is that is being stored on the mobile device, or showing the user what kind of data can be accessed. In an embodiment, personal data harvesting may be used to help convince the user to care more about securing their device; for example, the user may neglect security on their device if they think of only corporate data as being at risk, but may be more willing to secure their device if personal data is also shown to be at risk. According to another exemplary embodiment, personal data harvesting may be targeted at users who have more sensitive information, or more of a duty to secure it; for example, if a user has access to the entire customer list of a company, the system for assessing data security may specifically target the mobile device of that user.

According to another exemplary embodiment, data harvesting of personal and/or corporate information may also be executed by the system for assessing data security for the purpose of executing further attacks. For example, a user may be more willing to take action that violates a corporate code of conduct, such as accessing a link, if it comes from an apparently trusted source, or comes from a compromised trusted source. The system for assessing data security may also exercise remote control over a mobile device, and may utilize the functionality of the mobile device to target other users. For example, the system for assessing data security may exercise remote control over a compromised mobile device and may, for example, use it to send messages to stored contacts, post messages on social media, surreptitiously record video, audio, or other sensor data (such as accelerometer or GPS data), or may perform other functions, as desired.

According to one exemplary embodiment, attacks executed by the system for assessing data security may be multi-faceted. For example, a corporate-managed mobile device operated by a user could be sent several messages from several different sources in order to test the effectiveness of each one. According to one exemplary embodiment, these messages may be sent by different senders; for example, a corporate officer could be sent one SMS message containing a link that is purported to come from another corporate officer (such as the CIO), and could be sent another SMS message containing a link that is purported to come from a friend or family member. According to another exemplary embodiment, a user could be sent messages using different communications protocols, such as via SMS and via email, or by other such communications methods as desired. This may allow the system for assessing data security to determine the susceptibility of users to attacks using different mediums, or may allow different communications methods to be tested based on information regarding vulnerabilities in a particular messaging standard, or for any other desired reason. System for assessing data security may also be used alongside other tools; for example, an exemplary embodiment of a system for assessing data security may test SMS message responses, or responses to other types of messages, and may be paired with an anti-phishing behavior management (APBM) program that is used to test e-mail.

Successful attacks, and/or metrics about the attacks such as the success rate of the attacks, may be reported to the operator of the system for assessing data security. Additional action may then be taken. For example, according to one exemplary embodiment, the system for assessing data security may provide information about the specific devices that are most vulnerable, or about the specific users who allowed the system for assessing data security to gain access to their mobile device. This may allow for security efforts to be prioritized; for example, those users could be enrolled in remedial security training classes, or could be given upgraded devices having better security, or could otherwise be the focus of security efforts, as desired.

A successful attack may also be used to determine the potential risk that a particular device poses to the enterprise network or to other devices on the network. For example, the system for assessing data security may, upon gaining access to a particular mobile device, test the device to determine if it can be used to "pivot" further into the network. This may include, for example, determining whether the device can be used as a backdoor into the enterprise network, or determining whether the device could be used to exfiltrate corporate data from the enterprise onto a mobile carrier or other network.

According to an exemplary embodiment, a method of using a system for assessing data security may be as follows.

First, the system for assessing data security may be connected to a network, such as an enterprise network, cellular network, or the Internet. For example, according to one exemplary embodiment, the system for assessing data security may have an Internet connection. According to another exemplary embodiment, the system for assessing data security may include a connection to a SIM card; for example, according to an embodiment wherein the system for assessing data security includes a general-purpose computer, a SIM card may be connected to the general-purpose computer via a USB or other hardware connection, and the system for assessing data security may be operable to communicate with the SIM card using a software or hardware method such as a serial port connection or other cable connection. According to another exemplary embodiment, the system for assessing data security may operate in connection with a cell tower or base station, such as a software defined radio cell tower, or another communications device, as desired.

Second, an exemplary embodiment of a system for assessing data security may message one or more devices, for example based on a phone number or list of phone numbers that is available to it. Phone numbers may be stored in the form of a data file, such as a text or comma-separated-values file, or may be read from some other medium or format. Messages sent by the system for assessing data security may be set by default and editable by a user, or may be variable. According to an exemplary embodiment, a default message sent by the system for assessing data security might be "This is a cool app" or "This is a cool page," followed by a hyperlink to a download location to a malicious app or a site that may, for example, automatically register users for a security course, or register the user for a security course based on the user sharing their credentials with the site. According to another exemplary embodiment, the message might be dynamically changed, for example based on known user characteristics.

According to an exemplary embodiment wherein a malicious app is used, the malicious app may be configured to ask for additional privileges above and beyond those of the original app. This may be paired with a security training course; for example, it may be used to test whether or not the user has reviewed the permissions screen. According to another exemplary embodiment, the malicious app may not request any additional permissions and may try to use vulnerabilities to gain root access to the device.

Third, once a user has installed a malicious app, an exemplary embodiment of a system for assessing data security may take further action to assess security vulnerabilities. For example, according to an exemplary embodiment, a particular mobile device running a malicious app may be used to pivot between a public network and an internal private network. According to another exemplary embodiment, a particular mobile device running a malicious app may be used to message other devices on the network, for example with a link to install the app. Other functions of the malicious app may also be envisioned; for example, according to an exemplary embodiment, it may be used to map an internal network, and return such values as the host IP address or any open ports. This may allow access to the network to be gained from the outside; alternatively, access to the network may be gained through the mobile device.

In a potential fourth stage, according to an exemplary embodiment, a mobile device running a malicious app may be used to bypass egress filtering or other data controls on the network. According to such an embodiment, in order to bypass restrictions on sending corporate data outside of the perimeter via one of the computers on the network, corporate data may be pivoted back out of the mobile device.

FIG. 1 displays an exemplary embodiment of a system diagram of a system for assessing data security. According to an exemplary embodiment, a server apparatus 100 may include a database 102, a web server 104, an engine 106, and a listener system 108, which may be implemented as part of the same device or as part of different devices, as desired. According to an exemplary embodiment, server apparatus 100 may be implemented on a cloud service or other hosting service; for example, server apparatus 100 may be implemented in whole or in part on an Infrastructure as a Service (IaaS) platform. According to another exemplary embodiment, server apparatus 100 may be embodied in a physical device; such an embodiment may be used to, for example, keep all data on the premises of the site undergoing testing. According to an exemplary embodiment, server apparatus 100 may also incorporate one or more simulated servers alongside real web servers 104; simulated servers may be used to, for example, simulate tests on target systems, or as desired.

Server apparatus 100 may be configured to communicate, using an internet connection or other wireless communication method 110, with a test phone 112. Test phone 112 may have a gateway app 114 configured to operate as part of a system for assessing data security, and which may be used to launch attacks. According to an exemplary embodiment, gateway app 114 may communicate between the test phone 112 and the server apparatus 100.

The gateway app 114 may be configured to execute or facilitate the execution of test attacks 116. According to an exemplary embodiment, the gateway app 114 may be configured to directly simulate an attacker. According to another exemplary embodiment, the gateway app 114 may send and receive communications with the server apparatus 100, for example in order to allow external access to a company network or other access-restricted network, and may allow attacks 116 to be executed by the server apparatus 100. Different attacker profiles may be simulated by the server apparatus 100 and/or the gateway app 114; for example, one attacker profile may simulate an attacker using highly out-of-date vulnerabilities and widely-available scripts, while another attacker profile may simulate a PEST (persistent, sophisticated, and targeted) attacker. This may be useful to, for example, gauge the level of security of a particular network by determining what types of attackers it may be vulnerable to.

Test attacks 116 may be executed against a company network (or the network of another organization), or may be executed against specific user devices, for example test subject devices 118. According to an exemplary embodiment, test subject devices 118 may be other devices on the company network. According to another exemplary embodiment, test subject devices 118 may be devices belonging to employees of the company or which are otherwise associated with the company. A wide range of test subject device 118 configurations may be understood; for example, according to an exemplary embodiment, test subject devices 118 may be iOS devices, Android devices, Windows devices, "smart devices" running embedded software, or other devices, as desired.

Test attacks 116 may make use of any messaging protocol or combination of messaging protocols, such as, for example, SMS, MMS, email, instant messaging, in-app messaging, near-field communication (NFC), Bluetooth, ZigBee, Z-Wave, voice communication, or another form of electronic communication, as desired. According to an exemplary embodiment, a message used in a test attack 116 may include a message body, which may be, for example, text, an image (such as a QR code), a video, a sound or voice recording, or another message body, as desired. A message used in a test attack 116 may also include a hyperlink or another reference to a website location.

Test attacks 116 may take the form of attempting to get the users of the test subject devices 118 to install an app on their devices, or otherwise compromise its security. According to an alternative exemplary embodiment, test attacks 116 may take the form of attempting to exploit inherent vulnerabilities in a particular test subject device 118 or type of test subject device 118. As previously mentioned, test attacks 116 may include, for example, attacks directed at the user of the device, such as attempting to trick or persuade the user into entering their credentials into a credential-harvesting web page, or attempting to trick or persuade the user to download a data file or other file (such as a MDAC, PDF, or HCP file) having various vendor vulnerabilities, which may then later be exploited. Test attacks 116 may also include, for example, remote code execution attacks that do not require a response from the user, such as remote code execution attacks using the Stagefright vulnerability. Once a test subject device 118 has been successfully attacked or compromised, it may communicate this 120 to a listener system 108 or otherwise communicate it to the server apparatus 100. According to an exemplary embodiment, server apparatus 100 may then communicate 110 with the compromised test subject device 118 as if it were a new test phone 112, and perform similar steps to attempt to attack 116 other devices networked to or otherwise linked to the compromised test subject device 118.

According to an exemplary embodiment, the listener system 108 may include a listener, and may be configured to take some action upon receiving a signal 120 from one or more of the test subject devices 118. According to another exemplary embodiment, the listener system 108 may include a poller, and may periodically check to see if a signal 120 has been sent from one or more of the test subject devices 118. Listener system 108 may also include an API, an app, and/or an agent, as desired. The API may govern how the listener system 108 interacts with other system components and/or interface software and hardware. According to an exemplary embodiment, the API may use REST, JSON, or another standard, as desired. The app may be a duplicate or analogue of the gateway app 114. According to an exemplary embodiment, the gateway app 114 may be configured to communicate with instances of itself, and the server apparatus 100 may operate the gateway app 114, under the same or a different configuration, in order to send and/or receive communications from other devices running the gateway app 114. According to another exemplary embodiment, the app may incorporate aspects of the gateway app 114, such as the ability to execute attacks 116, but may be more limited in functionality. An agent may be any software agent or multi-agent system, as desired.

Server apparatus 100 may also include one or more interfaces, for example graphical user interfaces, which may display output 122, 124 from the server apparatus 100 to a user of the server apparatus 126. According to an exemplary embodiment, a web server component 104 of the server apparatus 100 may communicate with a user 126 via a graphical user interface, while an engine component 106 of the server apparatus 100 may be configured to display output 124 to a user 126 in the form of a text-based user interface. Other configurations may also be envisioned, as desired; for example, according to an exemplary embodiment wherein the server apparatus 100 includes or accesses a simulated server, simulated server may output information to a graphical or text-based user interface, as desired.

Figure 2:
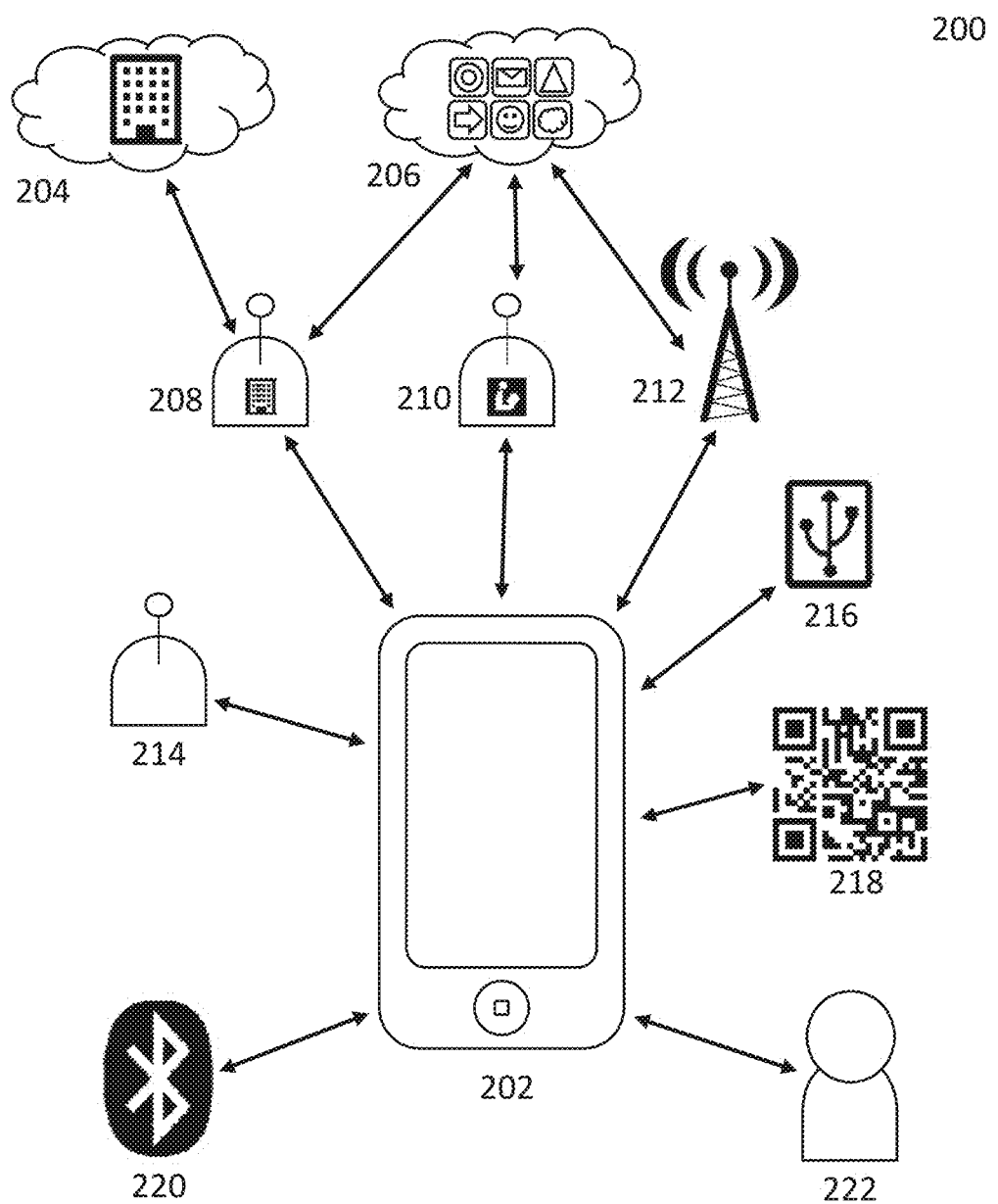
FIG. 2 is an exemplary embodiment of a threat model for a particular hardware device.

Turning now to exemplary FIG. 2, FIG. 2 displays an exemplary embodiment of a threat model 200 for a particular hardware device 202. Exemplary threats that may be faced by a hardware device 202 may include malicious apps, such as malicious public apps 206; remote attacks; rogue or insecure public Wi-Fi connections 210; rogue mobile hotspots or towers 212; rogue or insecure ad-hoc networks 214; attacks over a Bluetooth connection 220; hardware attacks, such as rogue power chargers 216; attacks using QR codes 218; phishing by email or text; theft of the device; and social engineering 222. Other types of threats or attacks, such as "client-side" attacks that seek to have the user add vulnerabilities to the device (for example, by downloading a file having a vulnerability, or by persuading the user to make harmful changes to their device security) may also be understood.

According to an exemplary embodiment, it may be desirable for a system for assessing data security to simulate some or all of the types of threats or attacks in a threat model 200. For example, according to an exemplary embodiment, a system for assessing data security may be able to execute remote attacks on a particular hardware device 202, may be able to execute attacks via Bluetooth 220, may be able to execute QRC attacks 218, may have a malicious app component 206, and may be able to simulate phishing attacks. Other exemplary embodiments of a system for assessing data security may have other functionality, as desired.

An exemplary embodiment of a system for assessing data security may also be configured to simulate or engage in post-attack behavior once it has gained access to a particular device. For example, according to an exemplary embodiment, a system for assessing data security may be configured to try to take remote control of a particular hardware device 202 once it has gained access. According to another exemplary embodiment, a system for assessing data security may attempt to use the presence of a hardware device 202 on a corporate network 208, or the authorization of the hardware device 202 to be so present, in order to pivot onto the corporate network 208, such as corporate Wi-Fi. According to another exemplary embodiment, a system for assessing data security may engage in simulated data theft of personal data, for example personal data stored on the hardware device 202, or simulated data theft of corporate data 204.

Personal data or corporate data 204 may include, for example, material that can potentially be used to execute further attacks, such as social engineering attacks 222. For example, a particular hardware device 202 may store a personal email address, personal texts, personal photos, or social media posts, or may store user credentials like an account password for social media. Hardware device may also store user history, such as location history or Web history. Hardware device 202 may also have particular apps, such as hardware synch apps, that can be used to access personal files or other data. Hardware device 202 may also retain some corporate data, such as a corporate email, corporate contacts, a corporate calendar, data files, or access to one or more databases. A system for assessing data security may be configured to seek out such data. According to an exemplary embodiment, such data may be used in order to simulate further attacks. According to another exemplary embodiment, a system for assessing data security may make a record of data that may be obtained from a hardware device 202, for example in order to show the user of the hardware device 202 what information can be taken from it by an attacker.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for conducting a simulated phishing attack on one or more phishing attack target devices associated with an administrator, comprising:
   selecting, with a processor, one or more phishing attack target devices from a plurality of first phishing attack target devices,
   generating and sending a test message to the one or more phishing attack target devices, and, following a step of generating and sending the test message, electronically recording, in a computer readable storage medium, an accessing device in the one or more phishing attack target devices that have accessed a website associated with the administrator;
   identifying a user associated with the accessing device, and providing, to the user, on the accessing device, a message prompting the user to authorize a download of a malicious app associated with the administrator;
   after the authorization is received, downloading and installing the malicious app onto the accessing device, and installing, from the malicious app, an on-device agent configured to automatically send test messages using the processor of the accessing device, the on-device agent further configured to scan a memory of the accessing device using the processor of the accessing device for contact information for a second phishing attack target device of another user;
   automatically sending, with the on-device agent and using the processor of the accessing device, a second test message directly to the second phishing attack target device, the second test message comprising identifying information for the user and a referral to the website associated with the administrator; and
   automatically enrolling, with the processor, the user in a security course.

2. The method of claim 1, wherein the plurality of first phishing attack target devices comprise a plurality of phones, each phone having a phone number; and
   wherein a step of selecting, with the processor, one or more phishing attack target devices from a plurality of first phishing attack target devices comprises selecting one or more phone numbers from a plurality of phone numbers.

3. The method of claim 1, wherein the contact information for the second phishing attack target device of the another user comprises phone number information.

4. The method of claim 1, wherein the contact information for the second phishing attack target device of another user further comprises at least one of group information or importance information.

5. The method of claim 1, wherein the on-device agent is further configured to match the contact information for the second phishing attack target device of the another user to social media information of the another user, and retrieve further contact information from the social media information of the another user.

6. The method of claim 1, wherein the on-device agent is further configured to determine access level information for at least one of: a phishing attack target device in the plurality of first phishing attack target devices, and the second phishing attack target device; and
wherein the on-device agent is further configured to specifically target an attack against a user having a higher access level.

7. The method of claim 1, wherein the method comprises selecting a plurality of phishing attack target devices, a plurality of accessing devices, and a plurality of users associated with the accessing device, and scanning a memory of each of the plurality of accessing devices to provide a plurality of memory scan results; and
identifying, from the plurality of memory scan results, a device in the plurality of accessing devices posing a biggest risk to an enterprise network on which the plurality of accessing devices are located.

8. The method of claim 1, wherein the on-device agent is further configured to scan a memory of the accessing device using the processor of the accessing device for at least one sandboxed application, and is configured to attempt to access the at least one sandboxed application.

9. The method of claim 1, further comprising:
accessing and downloading, with the on-device agent, at least one file associated with a network data control, and sending, with the on-device agent, the at least one file to a location outside of the network.

10. The method of claim 1, further comprising:
prompting the user to download a file, wherein the file comprises at least one vulnerability, the vulnerability comprising computer program code that, when stored on the memory of a mobile device, configures the mobile device to be susceptible to at least one external attack.

11. A system for assessing data security, comprising:
a server apparatus, the server apparatus comprising a database, a web server, an engine comprising a processor, and a listener system, the listener system comprising at least one of a listener and a poller, the server apparatus associated with an administrator; and
one or more phishing attack target devices, the one or more phishing attack target devices each having a processor and a memory and being associated with an administrator;
wherein the server apparatus is configured to:
generate and send a test message to the one or more phishing attack target devices, and, following a step of generating and sending the test message, electronically record, in the database, an accessing device in the one or more phishing attack target devices that have accessed a website associated with the administrator;
identify a user associated with the accessing device, and provide, to the user, on the accessing device, a message prompting the user to authorize a download of a malicious app associated with the administrator;
after the authorization is received, download and install the malicious app onto the accessing device, wherein the malicious app is configured to install an on-device agent configured to automatically send test messages using the processor of the accessing device, the on-device agent being further configured to scan a memory of the accessing device using the processor of the accessing device for contact information for a second phishing attack target device of another user;
wherein the on-device agent is configured to, using the processor of the accessing device, send a second test message directly to the second phishing attack target device, the second test message comprising identifying information for the user and a referral to the website associated with the administrator; and
automatically enroll, with the processor, the user in a security course.

12. The system of claim 11, wherein the one or more phishing attack target devices comprise a plurality of phones, each phone having a phone number; and
wherein the server apparatus is configured to generate and send the test message to the one or more phishing attack target devices based on the plurality of phone numbers.

13. The system of claim 11, wherein the contact information for the second phishing attack target device of the another user comprises phone number information.

14. The system of claim 11, wherein the contact information for the second phishing attack target device of another user further comprises at least one of group information or importance information.

15. The system of claim 11, wherein the on-device agent is further configured to match the contact information for the second phishing attack target device of the another user to social media information of the another user, and retrieve further contact information from the social media information of the another user.

16. The system of claim 11, wherein the on-device agent is further configured to determine access level information for at least one of: a phishing attack target device in the plurality of first phishing attack target devices, and the second phishing attack target device; and
wherein the on-device agent is further configured to specifically target an attack against a user having a higher access level.

17. The system of claim 11, wherein the server apparatus is configured to select a plurality of phishing attack target devices, a plurality of accessing devices, and a plurality of users associated with the accessing device, and a plurality of on-device agents are configured to scan a memory of each of the plurality of accessing devices to provide a plurality of memory scan results; and
the server apparatus is further configured to identify, from the plurality of memory scan results, a device in the plurality of accessing devices posing a biggest risk to an enterprise network on which the plurality of accessing devices are located.

18. The system of claim 11, wherein the on-device agent is further configured to scan a memory of the accessing device using the processor of the accessing device for at least one sandboxed application, and is configured to attempt to access the at least one sandboxed application.

19. The system of claim 11, wherein the on-device agent is further configured to download, from the server apparatus, at least one file associated with a network data control, and send the at least one file to a location outside of the network.

20. The system of claim 11, wherein the accessing device is configured to prompt the user to download a file, wherein the file comprises at least one vulnerability, the vulnerability comprising computer program code that, when stored on the memory of a mobile device, configures the mobile device to be susceptible to at least one external attack.

* * * * *